Sept. 30, 1924.

P. MacGAHAN 1,509,967

ELECTRICAL MEASURING INSTRUMENT

Filed Feb. 15, 1919

WITNESSES:
H. T. Shelhamer
J. A. Procter

INVENTOR
Paul Mac Gahan
BY
Wesley G. Carr
ATTORNEY

Patented Sept. 30, 1924.

1,509,967

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL-MEASURING INSTRUMENT.

Application filed February 15, 1919. Serial No. 277,161.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical-Measuring Instruments, of which the following is a specification.

My invention relates to electric measuring instruments and particularly to power-factor meters.

One object of my invention is to provide means whereby a movable-vane power-factor meter is rendered independent of changes in current and frequency.

A further object of my invention is to provide a measuring instrument, of the above indicated character, that shall be simple and inexpensive to construct and effective in its operation.

In practicing my invention, I provide a movable magnetizable member, potential windings for energizing the same, and distributed current windings for co-operating with the magnetizable member to cause the same to assume positions in accordance with the phase-angular relation between the current and the voltage of the respective windings. A disk armature is associated with the movable member and is provided with a damping magnet for damping the oscillations of the same. Since the movable magnetizable member is affected in proportion to the product of the frequency and the square of the current, it will be seen that, in order for the instrument to be correct under all conditions of current and frequency, some means must be provided for correction of the same. In view of the above, I provide an electromagnet that is connected in series with the current windings of the meter and is adapted to create a positive torque on the disk armature that is proportional to the product of the frequency and the square of the current. With this arrangement, the instrument develops a torque that is equal, and opposed to, the effect on the magnetizable member and thus will indicate correctly under all conditions of frequency and current.

Figure 1:
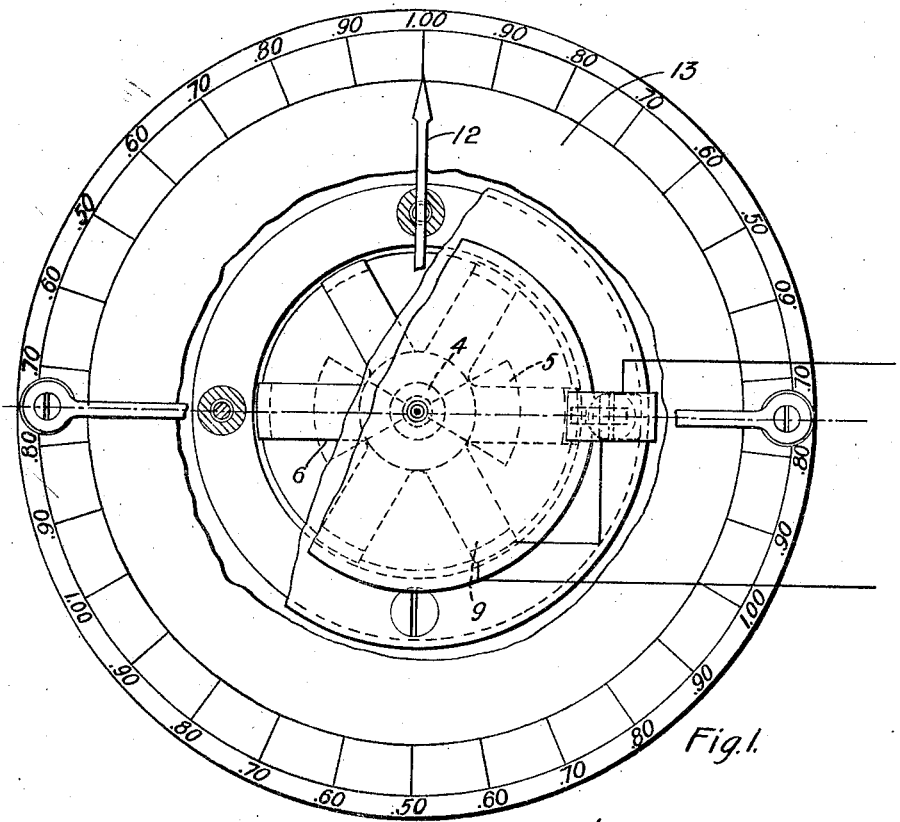
Figure 2:
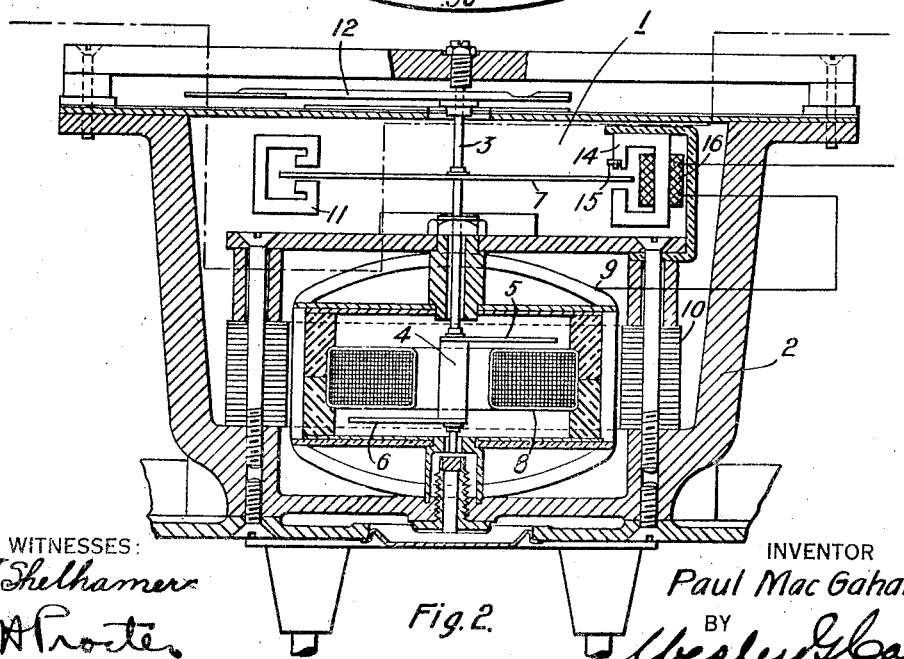

Figure 1 of the accompanying drawings is a top plan view, with portions cut away, of a power-factor meter embodying my invention, and Fig. 2 is a view, partially in section and partially in elevation, of the meter shown in Fig. 1.

The power-factor meter 1 comprises, in general, a casing 2 in which is mounted a shaft 3 upon which is disposed a magnetizable member 4 having vanes 5 and 6 thereon and upon which is also mounted a disk armature 7. A stationary potential coil 8 is disposed around the member 4 for the purpose of polarizing the vanes 5 and 6, and a distributed current winding 9 is disposed around the winding 8 and the vanes 5 and 6 for the purpose of co-operating with the vanes to cause the same to assume a position in accordance with the phase-angular relation between the currents traversing the windings 8 and 9. A core member 10 is disposed around the windings 9, and a permanent magnet 11 is provided for the armature 7. A pointer 12 is mounted on the shaft 3 and is adapted to co-operate with a scale 13 to indicate power factor.

Since it has been found that the windings 9 co-operate with the vanes 5 and 6 to affect the operation thereof, in accordance with the product of the frequency and the square of the current traversing the windings 9, I provide a magnetizable member 14 having a short-circuited winding 15 and a winding 16 that is connected in series with the windings 9 for so actuating the armature 7 as to completely correct the inaccuracies caused by the effect of the windings 9 on the vanes 5 and 6. That is, the winding 16 is traversed by the same current that traverses the windings 9 and thus causes the armature 7 to develop a positive torque proportional to the product of the frequency and the square of the current and, since this torque is equal and opposite to the action on the shaft 3 developed by the vanes 5 and 6, it will be seen that the pointer 12 will assume positions in accordance with the phase-angular relation between the currents traversing the windings 8 and 9, irrespective of the frequency and the value of the currents.

My invention is not limited to the particular form of instrument illustrated, as it may be variously modified without departing from the spirit and scope of the invention, as set forth in the appended claims.

I claim as my invention:

1. In a power-factor meter, the combination with a movable member, polarized members thereon, windings for actuating the polarized members, and a disk armature on the movable member, of means for actuating the armature to compensate for effects on the movable member caused by current and frequency changes.

2. In a power-factor meter, the combination with a movable member, windings for actuating the same and a disk armature connected thereto, of means connected to the windings for co-operating with the armature to neutralize the effects on the movable member incident to changes in current and frequency in the windings.

3. In a power-factor meter, the combination with a movable member, windings for actuating the same, of means electrically connected to the windings, and means mechanically connected to the movable member co-operating with said means to neutralize the drag effects on the movable member incident to changes in current and frequency in the windings.

4. In a power-factor meter, the combination with a movable member, windings for actuating the same and means connected thereto, of means connected to the windings for cooperation with said means to neutralize the drag effects on the movable member incident to changes in current and frequency in the windings.

5. In a power-factor meter, the combination with a movable polarized magnetizable member and windings for actuating the same, of a disk armature and means for causing said disk armature to develop an independent torque proportional to the product of the frequency and the square of the current traversing the actuating windings.

6. In a power-factor meter, the combination with movable magnetizable vanes, a potential winding for energizing the vanes, and current windings for actuating the vanes, of an armature operatively connected to the movable vanes, and means connected in series with the current windings for assisting in the actuation of the armature.

7. In a power-factor meter, the combination with a movable magnetizable member, and means for actuating the same, of electrical means for assisting the movement of the movable member in accordance with the product of the square of the actuating current and the frequency.

In testimony whereof, I have hereunto subscribed my name this 31st day of Jan. 1919.

PAUL MacGAHAN.